Figure 1:
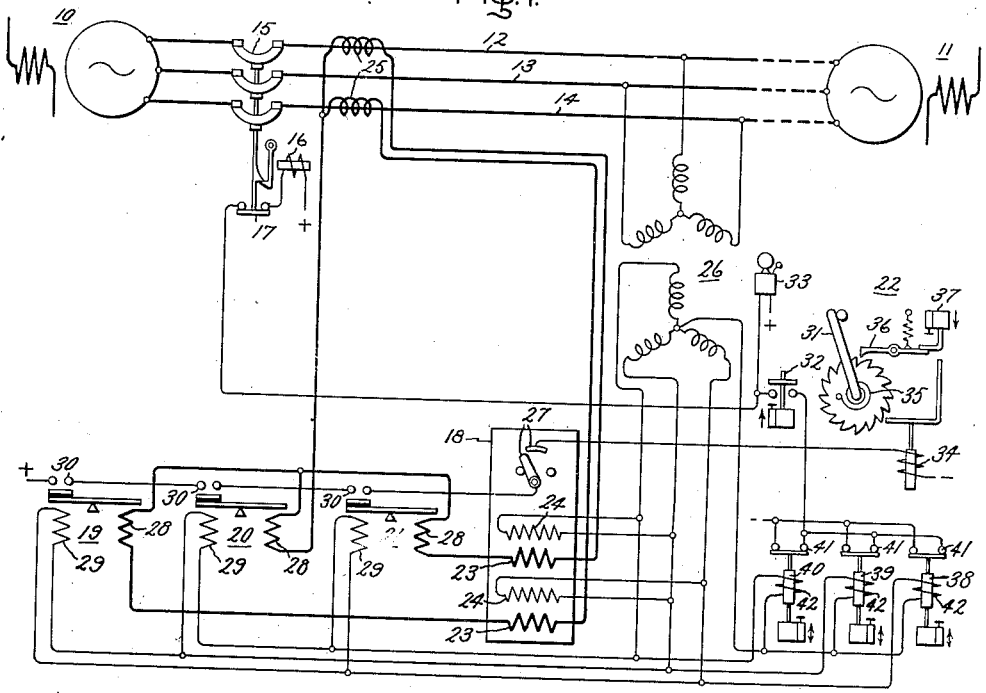

Feb. 2, 1943.  S. B. CRARY  2,310,065
SUPERVISION OF ELECTRIC SYSTEMS
Filed June 3, 1941

Inventor:
Selden B. Crary,
by Harry E. Dunham
His Attorney.

Patented Feb. 2, 1943

2,310,065

UNITED STATES PATENT OFFICE 2,310,065

SUPERVISION OF ELECTRIC SYSTEMS

Selden B. Crary, Schenectady, N. Y., assignor to General Electric Company, a corporation of New York Application June 3, 1941, Serial No. 396,436

10 Claims. (Cl. 175—294)

My invention relates to improvements in the supervision of alternating-current electric systems and more particularly to improvements in arrangements such as are disclosed in United States Letters Patent 2,052,377, 2,095,117, and 2,169,853, all assigned to the assignee of the present application.

The above-mentioned Letters Patent all relate to means for discriminating between faults and out-of-step conditions to detect asynchronous conditions of alternating-current systems and to eliminate such conditions in the shortest possible time, whereby to reduce the hazard of false operation of the system's fault protective apparatus and to avoid all sorts of troubles associated with instability.

Faults on an alternating-current electric system have been known to cause synchronous machinery to fall out of step and thereby to produce such unstable voltage and current conditions in sound portions of the system as to cause false operation of the fault responsive protective relays and the circuit breakers controlled thereby on the sound portions. Obviously, such false operation must be avoided because loads are likely to be left without any source of power. It is, therefore, desirable, on the occurrence of out-of-step conditions to subdivide the system or to disconnect synchronous dynamoelectric machines or remove the field therefrom in such a way as to eliminate the out-of-step condition, but no load is to be left without an adequate source of power. For subdividing the system, points may be chosen at which the normal exchange of power is small or such that the generating capacity in any subdivided part is sufficient to carry the load of that part.

In United States Letters Patent 2,095,117, referred to above, there is disclosed an asynchronous condition-responsive means which functions on the basis that, during asynchronous conditions, power reversals occur when the current is at is maximum value and also that, with purely fault conditions, there will not be more than two power reversals with abnormal current whereas, with asynchronous conditions, power reversals may continue indefinitely until synchronism is restored or the circuit is opened. In other words, if three power reversals accompanied by abnormal current conditions occur within a predetermined time, there is an indication of asynchronism as distinguished from faults and swings.

When a circuit breaker is opened in a circuit connecting two parts of a system which are out of step, that is, which have a large relative angular displacement with respect to each other, the fundamental and transient frequency recovery voltages may have magnitudes which are higher than that obtained for any other type of switching operation. Numerous cases are known in which actual switch failure occurred due to its inability to clear the circuit under such conditions and there are many cases in which the restriking of the arc in the circuit breaker has been particularly severe. This is due to the fact that, when a circuit breaker attempts to interrupt the circuit interconnecting two parts of a system which are exactly 180 degrees out of phase, the fundamental frequency recovery voltages obtain a value equal to approximately twice the normal line-to neutral voltage across each of the phase conductors of the switch. The transient voltages may be even greater approaching as much as four times normal and possibly six or seven times normal if there is restriking. It would be desirable, therefore, to provide an out-of-step protective scheme in which the switching severity under out-of-step conditions may be greatly reduced by permitting such switching only at points in the swing which will not result in such abnormal voltages across the circuit breaker contacts. This becomes particularly desirable in connection with modern high-speed circuit breakers wherein the arcing time in the circuit breaker is relatively small compared to the time required for the usual out-of-step oscillation between two parts of a system. At the present time, operating companies generally design their systems and predetermine the location of the out-of-step switching means so as to minimize the possibility of interruption to service in the remaining connected parts of the system.

It is an object of my invention, therefore, to provide an out-of-step protective scheme in which the switching severity under out-of-step conditions is greatly reduced.

It is another object of my invention to provide a protective system in which switching under out-of-step conditions is prevented at those points in the swing where abnormally high voltages would exist across the switching means.

Further objects and advantages of my invention will become apparent as the following description proceeds and the features of novelty which characterize my invention will be pointed out with particularity in the claims annexed to and forming a part of this specification.

Figure 2:
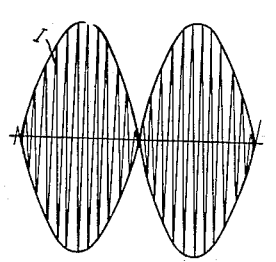
Figure 3:
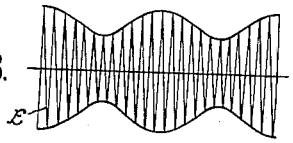
Figure 4:
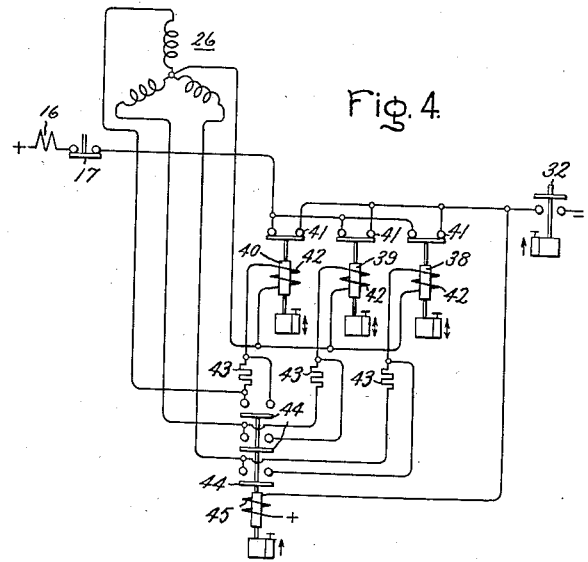

For a better understanding of my invention, reference may be had to the accompanying drawing in which Fig. 1 illustrates diagrammatically an embodiment of my invention in a polyphase alternating-current electric system, Figs. 2 and 3 are curve diagrams to aid in the understanding of the operation of the protective system illustrated in Fig. 1, and Fig. 4 diagrammatically illustrates a modification of a portion of the apparatus illustrated in Fig. 1.

Although my invention is applicable to any out-of-step protective scheme for either a single-phase or a poly-phase system, I have chosen to illustrate it specifically for explanatory purposes with the protective system illustrated in Fig. 1 of United States Letters Patent 2,095,117 referred to above. Accordingly, in Fig. 1, I have illustrated my invention as embodying a polyphase alternating-current electric system shown schematically and simply as comprising two synchronous dynamoelectric machines 10 and 11, which are interconnected by a tie line comprising phase conductors 12, 13, and 14. The balance of the system network and apparatus, such as feeders, transformers, and other devices have been omitted for the sake of simplicity of illustration. For subdividing the system, there may be provided suitable means illustrated as a latched closed circuit breaker 15 having a trip coil 16 and an $a$ switch 17 which is closed when the circuit breaker is closed and open when the circuit breaker is open.

When the machines 10 and 11 become asynchronous, the power transfer between these machines over the line 12, 13, 14, reverses twice for each electrical revolution of one machine relatively to the other. Since the system impedance is mostly inductance, one of these reversals is at the instant of maximum current flow when the electromotive forces of the machines are displaced substantially 180 degrees in phase relation, and the other is at the time of minimum current flow when the electromotive forces are substantially in phase. The latter reversal may also occur during oscillations of the type which become damped more or less quickly without producing out-of-step conditions. The actual phase displacement angles at which these reversals occur may differ somewhat from zero degrees and 180 degrees, depending on the natural angle of the system; that is, $$\tan^{-1}\frac{X}{R}$$

where X is the total reactance and R the total resistance from end to end, including the machines, and also upon the relative magnitudes of the system excitation voltages.

I have provided a detecting means which functions on the basis of a reversal of power under the maximum current conditions which comprises a power-directional relaying means 18, a plurality of current-responsive relays 19, 20, and 21, and cumulative action means, generally indicated at 22. The power-directional relay means 18 is shown as of the wattmeter type having current and voltage windings 23 and 24, respectively, which are respectively connected to be energized from current transformers 25 and potential transformers 26. The relay 18 is also provided with a passing contact arrangement such that its contacts 27 are normally open but close momentarily when a power reversal occurs. The torque characteristic of the power-directional relay may be $$T = \Sigma EI \cos\left(\theta - \cot^{-1}\frac{X}{R}\right)$$

where refinement is desired, but for most practical applications a power-directional relay having a true wattmeter torque $T = \Sigma EI \cos \theta$ should be satisfactory.

Although I have chosen to illustrate three current-responsive relays 19, 20, and 21, one or more would suffice. These relays may be simple overcurrent relays but, in order to obtain a response which is independent of the line-load conditions, the relays 19, 20, and 21 are preferably of the so-called "impedance-responsive" type having current windings 28 and potential windings 29, respectively connected to be energized from the current transformer 25 and the potential transformer 26. Inasmuch as an asynchronous condition affects all phases alike, it is preferable although not necessary to have one of these relays per phase in order to obtain differentiation between asynchronous conditions and faults. This differentiation holds for all but balanced three-phase faults which affect all the phases alike. For this differentiation, the relays 19, 20, and 21 are arranged so that their control is dependent upon their joint operation. For example, their contacts 30 may be arranged in series in a control circuit as shown.

When a fault such as a short circuit occurs, one or more of the abnormal current condition relays 19, 20, and 21 will operate, and the power-directional relay 18 will or will not make a passing contact, depending upon whether or not the fault is so located as to cause a change in the direction of flow of power. If the power flow was reversed by the fault, then when the fault is cleared, a return to the original direction of the power flow occurs. Thus, the power-directional relay 18 may make no passing contacts or two passing contacts. Obviously, if the abnormal current condition detecting relay or relays have their contacts closed, as during the fault or after the fault because of swings, there would result no discrimination between faults and out-of-step conditions. Subsequent oscillations causing power reversals would not result in the closing of the circuit through the contacts of the abnormal current condition relays and the contacts of the power-directional relay because at the time the power-directional relay makes its contact the current will be at a minimum and the contacts of the abnormal current condition relays will be open. In other words, the abnormal current condition relays and the power-directional relay alone provide discrimination between a fault or an out-of-step condition and an oscillating condition, but they do not provide complete discrimination between a fault and an out-of-step condition.

Cumulative action means 22 is provided in order to provide such complete descrimination and is under the joint control of the abnormal current condition relays 19, 20, and 21 and the power-directional relay 18. This cumulative action means 22 is illustrated in Fig. 1 as a notching relay of a type well known to the art. This relay is arranged through its controlling member 31 to control the device such as switch 32 which is normally open. Switch 32 has been illustrated as one which closes instantaneously and opens with a time delay as will be explained in greater detail hereinafter. Switch 32 is connected in series with trip coil 16 to control the tripping of circuit breaker 15 upon the occurrence of an asynchronous condition of the circuit of an indicating device, such as a bell alarm 33. Notching relay or cumulative action means 22 is effective, only after a predetermined number of actions, to operate switch 32. In other words, the operation of relay 22 is such that when, its winding 34 which is under the joint control of the abnormal current condition relays 19, 20, and 21 and the power-directional relay 18 is energized a predetermined number of times, the controlling member 31 is turned counter-clockwise against the bias of a spring 35 far enough to operate the switch 32. The return of the member 31 under the bias of spring means 35 between successive energizations of winding 34 is prevented by the pawl 36. If less than a predetermined number of actuations occur in a predetermined time, a time delay means, such as a dashpot 37, releases the pawl 36 and permits the return of the member 31 under the bias of its spring 35 to the initial position shown in Fig. 1.

Now, if an asynchronous condition occurs, it will affect all the phases alike, and, since a power reversal occurs at the time of maximum current condition of the power swing, the abnormal current condition relays 19, 20, and 21 will have their contacts closed simultaneously when the passing contact of the power-directional relay is made as the power reverses. Three successive reversals of power will consequently effect the corresponding number of energizations of the winding 34 of the cumulative action relay 22 and thereby cause the closing of the switch 32. The number of actions which the cumulative action means must make before completing its operation is not limited to three but may be three or more because, as previously pointed out, it may undergo two successive actions under fault conditions which are not necessarily coexistent with out-of-step conditions.

The arrangement described thus far is not my invention but is disclosed and claimed in the above-mentioned United States Patent 2,095,117.

In order to increase the probability of opening circuit breaker 15 on out-of-step conditions when there is a small angular displacement between the potentials of the two parts of the system so very little current is interchanged and, consequently, to reduce the circuit breaker recovery voltage severity, I have provided a plurality of voltage relays 38, 39, and 40 whose contacts 41 are connected in parallel with one another and in series with switch 32 and trip coil 16. Relays 38, 39, and 40 have their windings 42 energized with line-to-neutral voltages from potential transformer 26. Thus, when an out-of-step condition occurs and the out-of-step protective device causes switching means 32 to close its contacts to trip circuit breaker 15, such tripping is not permitted unless one of the line-to-neutral potentials of the system is of a predetermined value. This assures that the angular phase displacement between the voltages involved is not large at that instant so that the circuit breaker is allowed to trip. In order to reduce the probability of incorrect operation, voltage relays 38, 39, and 40 may be provided with short time-delay means. Such time delay should be long enough to reduce the possibility of incorrect operation due to suddenly applied potentials caused by switching but sufficiently short so that the potential relays may follow the voltage swing due to the out-of-step condition.

The operation of the out-of-step protective scheme illustrated in Fig. 1 in so far as my invention applied thereto is concerned may best be understood by reference to Figs. 2 and 3. In Fig. 2, the curve I indicates the current flowing between the two parts of the system during an out-of-step condition while, in Fig. 3, the curve E indicates the corresponding voltage. The envelopes of these curves represent the slip cycle. It will be observed by comparing Figs. 2 and 3 that, when the angular displacement between the two parts of the system is zero, the interchange of current is a minimum and the voltage is a maximum. Accordingly, it is desirable to open circuit breaker 15 when the voltage is a maximum or within a range on either side of this maximum voltage. By observing the curves of Figs. 2 and 3, the operation of the protective system disclosed in Fig. 1 is obvious, and, even though switching means 32 calls for tripping of circuit breaker 15 because of the existence of an out-of-step condition, such tripping cannot occur until one of the potential relays 38, 39, or 40 picks up to indicate that the swing voltage is above a predetermined value and to insure opening of the circuit breaker at a point during the swing cycle when the angular displacement between the two parts of the system is very small.

In order that proper operation of the out-of-step protective system may be insured, even in case the potential during the swing condition does not reach a predetermined setting of voltage relays 38, 39, and 40, it may be desirable to decrease the setting of these relays after a short interval so that operation of the out-of-step relay will result at a lower value of voltage. Accordingly, in Fig. 4, I have illustrated a modification of a portion of the protective system of Fig. 1, and the corresponding parts thereof are designated by the same reference numerals. In series with each of the windings 42 of voltage relays 38, 39, and 40, there is provided a resistor 43 which is adapted to be short circuited by switching means 44 controlled by a relay 45 which is energized when switching means 32 is closed. Relay 45 is preferably provided with a short time delay so that the decreased setting of relays 38, 39, and 40 does not occur immediately upon closing of switching means 32. It will be evident to those skilled in the art that means other than that disclosed in Fig. 4 could be used to lower the settings of the potential devices gradually or in more than one step so that they would operate near the crest of one of the out-of-step voltage swings and, therefore, insure disconnection of the system by operation of circuit-interrupting means 15 when the relative angular electrical displacement between the voltages at the two ends of the system is small.

Although the relays 38, 39, and 40 have been described as voltage relays in order to insure out-of-step switching at the proper point in the swing cycle, it will be understood that other means for accomplishing this purpose may also be provided. For example, by reference to Fig. 2, it will be observed that current relays might be provided which permit out-of-step switching when the current reaches some minimum value. Also a power-factor relay could be used which required that the power factor be near unity before out-of-step switching during a swing condition would be allowed.

With slow-speed circuit breakers, it might be desirable in the case of short swing cycles to determine in advance at what point in the swing cycle tripping must be initiated in order that actual operation of circuit-interrupting means 15 will occur at a low angular displacement between the two ends of the system.

While I have shown particular embodiments of my invention as applied to an electric-protective system, it will be apparent to those skilled in the art that my invention is not limited to the particular arrangement shown but that changes and modifications may be made without departing from the spirit and scope of my invention and I aim in the appended claims to cover all such changes and modifications.

What I claim as new and desire to secure by Letters Patent of the United States is:

1. In combination with an alternating-current power system, circuit-interrupting means for segregating said system during out-of-step conditions so as to prevent damage to associated apparatus from such out-of-step conditions, an out-of-step protective device for distinguishing between faults and asynchronous conditions on said system for operating said circuit-interrupting means, and means for rendering said out-of-step protective device ineffective except when the angular displacement between the voltages at the two ends of the system is less than a predetermined amount.

2. In combination with an alternating-current system, circuit-interrupting means associated with said system and operable during out-of-step conditions on said system so as to prevent loss of system load, means for distinguishing between faults and asynchronous conditions on said system for operating said circuit-interrupting means only upon the occurrence of an out-of-step condition, and means responsive to an electrical condition of said system for rendering said last-mentioned means ineffective except when the voltage between the two parts of the system to be segregated during an out-of-step condition is greater than a predetermined amount.

3. In combination with an alternating-current system, circuit interrupting means associated with said system and operable during out-of-step conditions on said system, means for distinguishing between faults and asynchronous conditions on said system for operating said circuit-interrupting means only upon the occurrence of an out-of-step condition, and means for rendering said last-mentioned means effective to operate said circuit-interrupting means only when a potential of said system is more than a predetermined amount so as to reduce the switching severity on said circuit interrupting means to a minimum.

4. In combination with an alternating-current power system, circuit-interrupting means for segregating said system during an out-of-step condition so as to prevent loss of system load or damage to associated apparatus from said out-of-step condition, an out-of-step protective device for distinguishing between faults and asynchronous conditions on said system so as to operate said circuit-interrupting means only upon the occurrence of an out-of-step condition on said power system, and a potential relay energized from a potential of said system so as to render said out-of-step protective device effective to operate said circuit-interrupting means only when said potential is more than a predetermined amount.

5. In combination with an alternating-current power system, circuit-interrupting means for segregating said system during out-of-step condition so as to prevent loss of system load or damage to associated apparatus from said out-of-step condition, an out-of-step protective device for distinguishing between faults and asynchronous conditions on said system so as to operate said circuit-interrupting means only upon the occurrence of an out-of-step condition on said power system, a potential relay energized from a potential of said system so as to render said out-of-step protective device effective to operate said circuit-interrupting means only when said potential is more than a predetermined amount, and means for changing the setting of said potential relay after a predetermined delay.

6. In combination with an alternating-current power system, circuit-interrupting means for segregating said system during out-of-step conditions, means for distinguishing between faults and asynchronous conditions on said system for operating said circuit-interrupting means only upon the occurrence of an out-of-step condition on said system, and further means for rendering said last-mentioned means ineffective to operate said circuit-interrupting means during an out-of-step condition until the swing potential is above a predetermined value to insure opening of the circuit breaker at a point during the swing cycle when the angular displacement between the voltages at the two ends of the system is very small.

7. In combination, an alternating-current system, and means for distinguishing between an asynchronous condition of the system and all faults except a fault involving all phase conductors and accompanied by a reversal in direction of power flow including a control circuit comprising a plurality of contacts arranged in series relation with each other, means for actuating a plurality of said contacts to circuit-controlling position in dependence on the respective currents in a plurality of phase conductors of the system, means for actuating another of said contacts to circuit-controlling position on the occurrence of a reversal of power at a point in the system, cumulative action means cooperating with said first-mentioned means for distinguishing between faults involving all phase conductors and an asynchronous condition including contacts operable after a predetermined operation of said plurality of contacts arranged in series relation with each other, a set of contacts connected in series with the contacts of said cumulative action means, and means for actuating said last-mentioned contacts to circuit-controlling position when the voltage of said system exceeds a predetermined value.

8. In combination, an alternating-current electric system and means for determining a sustained asynchronous condition of the system including a device to be operated, cumulative action means effective only after a predetermined number of actions to operate said device, means for actuating said cumulative action means including means connected to be energized responsively to system current conditions and cooperating power directional responsive means connected to be energized responsively to system current and voltage conditions, and means for preventing the operation of said device except when the angular displacement between the voltages at the two ends of said system under a sustained asynchronous condition is less than a predetermined amount.

9. In combination with an alternating-current electric system, a control device, an out-of-step protective device for distinguishing between faults and asynchronous conditions on said system for operating said control device, and means responsive to an electrical condition of said system for rendering said out-of-step protective device ineffective to operate said control device except when the voltage between the two parts of the system to be segregated during an out-of-step condition is greater than a predetermined amount.

10. In combination, an alternating-current system, means for distinguishing between faults and asynchronous conditions on said system, means controlled by said distinguishing means, and means responsive to an electric condition of said system indicative of the angular displacement between the voltages at two predetermined points of the said system for preventing said distinguishing means from effecting the operation of the second mentioned means when said angular displacement exceeds a predetermined amount.

SELDEN B. CRARY.